March 14, 1933.  R. N. EARLY  1,901,636
ELECTRIC MOTOR STARTING SYSTEM
Filed July 3, 1930
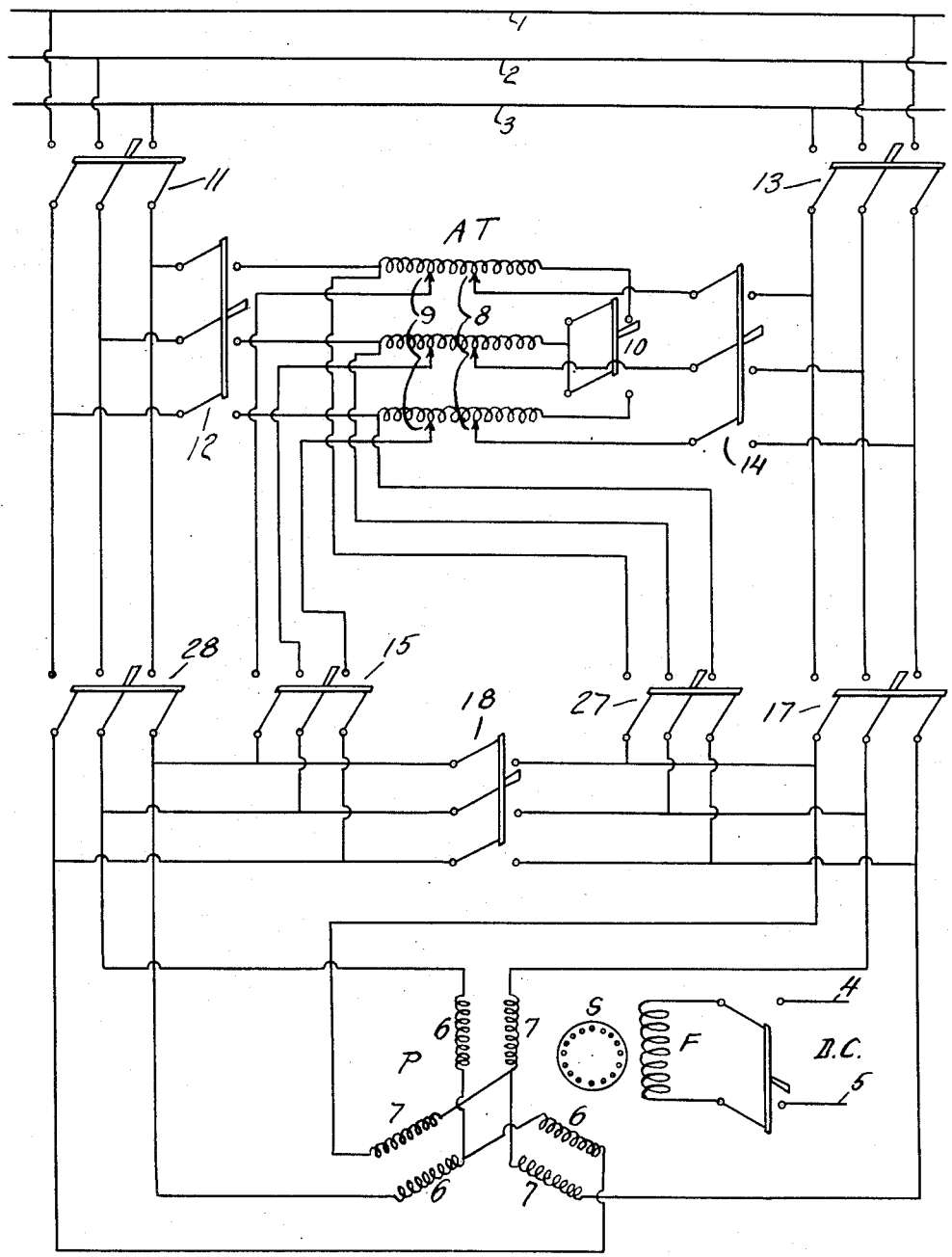
INVENTOR
Rupert N. Early
BY
Pennie, Davis, Marvin & Edmonds
HIS ATTORNEYS Patented Mar. 14, 1933

1,901,636

UNITED STATES PATENT OFFICE

RUPERT NUCKOLLS EARLY, OF MINNEAPOLIS, MINNESOTA, ASSIGNOR TO ELECTRIC MACHINERY MANUFACTURING COMPANY, OF MINNEAPOLIS, MINNESOTA, A CORPORATION OF MINNESOTA

ELECTRIC MOTOR STARTING SYSTEM

Application filed July 3, 1930. Serial No. 465,572.

This invention relates to electric motors and more particularly concerns improvements in starting methods and systems for alternating current electric motors.

Alternating current motors of the synchronous or induction type are customarily started by applying reduced voltage to their primary windings until they have accelerated to a predetermined speed and then applying full voltage thereto. In many installations, this starting method is undesirable in that the motor windings are temporarily disconnected from the line when the change from reduced voltage to full voltage is made, and an undesirable line surge results when full voltage is applied to the temporarily de-energized primary windings. When the primary windings are disconnected from the line to effect a change in the voltage applied thereto, the torque developed by the motor drops to zero, and the acceleration of the motor is accordingly irregular if any appreciable load is carried during the starting period. Further, known starting methods are not sufficiently flexible for starting motors and bringing them up to operating speed under various adverse load conditions without producing undesirable line surges and irregularities in torque.

In my copending applications, Serial No. 334,881, filed January 25, 1929 and Serial No. 430,702, filed February 24, 1930, I have described and claimed motors and starting methods in which a plurality of sections of the motor primary windings are successively energized during the starting period. In the systems of these applications the motor primary windings are not disconnected from the line during the starting period.

My present invention relates to various improvements on the starting methods and systems of my applications above referred to, and in general, comprises an improved starting method whereby an alternating current motor may be started and accelerated to operating speeds in a plurality of steps of energization, including, in certain cases, the application of over-voltage to the motor windings, the successive stages of energization being effected without disconnecting the motor windings from the power supply circuit. In addition to an improved starting method, it is an object of the present invention to provide improved apparatus for carrying the method into effect.

In general, the objects of my invention are carried out by employing an alternating current motor having a primary winding composed of at least two separately energizable winding sections, and by successively applying increasing voltages to the separate winding sections from a power source. The various voltages applied to the winding sections of the motor are preferably obtained by employing suitable voltage reducing and increasing means, such as a transformer or a voltage regulator. The energization of the several winding sections is so effected that the primary winding of the motor is never entirely disconnected from the power supply circuit during the starting period, at least one winding section remaining energized when the other winding sections are disconnected from the power supply circuit to permit a change in the voltage applied thereto.

The invention will be best understood by reference to the accompanying drawing in which a system embodying my invention has been shown in a simplified and diagrammatic manner. In the drawing, the single figure is a diagrammatic representation of an improved starting system embodying my invention and applied to an alternating current electric motor.

Referring to the drawing, I have shown a synchronous motor having a three-phase star-connected primary winding P, a field or secondary winding F and a squirrel cage winding S. The wires 1, 2 and 3 represent a source of three-phase alternating current, and a source of direct current is represented by the wires 4 and 5.

Although the motor shown is of the synchronous type, the invention covers the combination of my improved control system with induction motors as well. It is obvious that by disregarding the secondary or field winding F, the motor shown may be considered as an induction motor.

In the disclosed embodiment, the primary winding P of the motor comprises two separate winding sections 6 and 7, each section comprising a polyphase star-connected winding. Although two separate winding sections are shown, the number of such sections employed may be two or more, and the winding sections may be connected in star or in delta, as desired.

A suitable device is preferably employed for supplying a variety of different voltages from the power supply line 1, 2, 3 for use in energizing the motor primary winding sections during the starting period. Various devices, such as transformers, resistors or voltage regulators, may be employed for this purpose and in the disclosed embodiment, an auto-transformer AT is used. The transformer shown is provided with two sets of voltage taps 8 and 9, and a switch 10 is provided to control the connection between the three-phase windings of the transformer for a purpose which is hereinafter described. The auto-transformer AT may be connected to the power supply circuit 1, 2, 3 by closing the switches 11 and 12 or the switches 13 and 14, and the primary winding sections 6 and 7 of the motor may be supplied with reduced or increased voltages from the transformer by various sequences of switching operations as hereinafter described.

As explained above, the method of the invention comprises generally the successive application of different voltages to the separate sections of the motor primary windings, one winding section being maintained energized while the energizing circuit for the other winding section is broken for the purpose of changing the voltage applied thereto. In certain cases, over-voltage is applied to one or all of the primary winding sections during the starting period, and in such cases the return to normal voltage is effected by separately reducing the voltage applied to each section whereby the entire primary winding is never deenergized. Since my improved starting method may consist of a variety of different sequences of switching operations, I will describe a number of typical starting sequences which may be accomplished by the apparatus shown.

One starting method is effected by first applying reduced voltage to one primary section, then applying full voltage to the other section and finally applying full voltage to the two sections in parallel. Referring to the drawing, this method may be carried out by first closing the switches 10, 11, 12 and 15, thereby energizing the auto-transformer AT and connecting reduced voltage from the secondary taps 9 to the primary winding section 6 through a circuit which is obvious from the drawing. After a suitable interval, the switches 13 and 17 are closed, thus connecting full line voltage to the primary winding section 7 and thereby increasing the motor torque. As a final step of this method, the switches 11 and 15 are opened and the switch 18 is closed, thus increasing the voltage on the primary winding section 6 to full line voltage.

In the above described starting method as well as in the modified starting methods to be described, it should be understood that if the motor is of the synchronous type, the field or secondary winding F is energized by direct current and the motor is synchronized after the motor has accelerated to a suitable speed near synchronous speed. The energization of the field winding may be manually effected or may be automatically controlled by suitable means, and in certain cases, I prefer to employ the means responsive to electrical conditions in the motor secondary windings for controlling the energization of the field winding F. A system embodying this type of automatic control is described in reissue Patent No. 17,180 to Charles T. Hibbard.

A second starting sequence which may be effected by the apparatus shown comprises successively applying reduced voltage to the two primary winding sections and then successively applying full voltage to these winding sections. To carry out this starting sequence the switches 10, 11, 12 and 15 are first closed to connect reduced voltage from the auto-transformer taps 9 to the primary winding section 6 of the motor, and after a suitable interval, the switch 18 is closed to connect reduced voltage to the winding section 7. When the motor has accelerated to a suitable speed, the switch 18 is opened and the switches 13 and 17 are closed, thus applying full voltage from the line to the primary winding section 7. Subsequently, switches 11 and 15 are opened and the switch 18 is again closed to apply full voltage to the winding section 6.

The above described starting methods can be modified by using the auto-transformer as a reactor during one or more steps of the starting sequence and in this manner, obtaining an additional voltage variation. Thus the winding section 6 may first be supplied with reduced voltage from the auto-transformer AT by closing the switches 10, 11, 12 and 15, and after an interval, the switch 10 may be opened and the auto-transformer coils used as series reactors. The switches 13 and 17 are next closed to apply full voltage to the winding section 7, and finally the switches 11 and 15 are opened and the switch 18 is closed to apply full voltage to the winding section 6.

The above described starting method may be varied to give an additional starting step by first closing the switches 10, 11, 12 and 15 to apply reduced voltage to the primary winding section 6, then closing the switch 18 to apply reduced voltage to the section 7 and next opening the switch 10 to convert the auto-transformer into a series reactor and to supply higher reduced voltage to both winding sections 6 and 7 in parallel. To complete this starting sequence, the switch 18 is opened and the switches 13 and 17 are closed, thus energizing the winding section 7 with full voltage, and finally the switches 11 and 15 are opened and the switch 18 is closed to connect full voltage to both winding sections 6 and 7 in parallel.

If desired, several different reduced voltages may be applied to the motor windings from the auto-transformer during the starting period. Thus, the switches 10, 11, 12, 14 and 17 may be first closed to apply reduced voltage from the auto-transformer taps 8 to the primary winding section 7, and after a suitable interval, the switch 15 may be closed to apply a higher reduced voltage from the taps 9 of the auto-transformer to the primary winding section 6. This starting sequence may be completed by first opening the switch 14 and closing the switch 13 to apply full voltage to the winding section 7 and then opening the switches 11 and 15 and closing the switch 18 to apply full voltage to the winding section 6.

As explained above, it is necessary or desirable in certain cases to employ over-voltages, that is, voltages higher than full line voltage, in starting alternating current motors. Thus, when the initial load is very heavy as in shop installations where considerable line shafting is driven by the motor and the initial or break-away torque is high, voltages in excess of full line voltage may be necessary in order to break the motor from rest. This may be conveniently accomplished with the system of the present invention without producing undesirable line surges, the voltage being built up in the desired steps until the motor starts and accelerates to speed, after which the voltage is reduced to normal full line value. In this starting sequence as in all of the starting methods of the invention, the various voltage changes are effected without deenergizing the entire motor windings at any time during the starting period, and consequently, the surges in line current which occur upon a change in the applied voltage do not attain excessive values.

As an example of a starting sequence embodying the use of over-voltage, the switches 10, 11, 12, 14 and 17 may first be closed to put reduced voltage from the auto-transformer taps 8 on the primary winding section 7, and then the switch 15 may be closed to put higher reduced voltage from the taps 9 on the winding section 6. The switch 14 may then be opened and the switch 13 closed to put full line voltage on the winding section 7, and if the motor still fails to start or accelerate, the switch 11 may be opened and the switch 14 closed to put over-voltage on the winding section 6. With this connection, the transformer AT is used as a step-up transformer, being supplied with line voltage through the taps 8 and supplying a higher voltage to the winging section 6 through the higher taps 9. Assuming that with over-voltage on the winding section 6 and full voltage on the section 7 the motor starts and accelerates, the return to full voltage on the winding section 6 may be then effected by opening the switch 15 and closing the switch 18.

The above described over-voltage starting sequence may be simplified by omitting one of the reduced voltage steps. Thus, the switches 10, 11, 12 and 15 may first be closed to apply reduced voltage to the winding section 6, and the switches 13 and 17 may then be closed to apply full voltage to the winding section 7. Over-voltage may next be applied to the winding section 6 by opening the switch 11 and closing the switch 14, and after the motor has started and accelerated to a suitable speed, the switch 15 may be opened and the switch 18 closed to apply full line voltage to the winding section 6.

It will be obvious that many starting sequences in addition to those described above may be obtained by suitable manipulation of the switches in the apparatus shown. Thus the voltage applied to each winding section may be increased to full voltage or over-voltage in different series of steps which may be arranged to suit the starting requirements of the motor with which the system is employed and the load carried by such motor. If the power line requirements make it necessary, the voltages applied to the winding sections may be increased in relatively small steps so that the surges in the line current during starting are reduced to very small values.

An example of a starting sequence embodying my invention and involving voltage increases by small steps will now be given. The switches 10, 11, 12, 14 and 17 are first closed, supplying reduced voltage to the winding section 7, and the switch 15 is next closed to apply a higher reduced voltage from the auto-transformer taps 9 to the winding section 6. The switch 14 is then opened and the switch 13 closed to apply full voltage to the winding section 7. The switch 11 is then opened and the switch 14 closed to apply over-voltage from the taps 9 to the winding section 6 and subsequently the switch 17 may be opened and the switch 27 closed to apply a higher over-voltage to the winding section 7. The high over-voltage may then be applied to the winding section 6 by opening the switch 15 and closing the switch 18. Assuming that with high over-voltage thus applied to both the primary winding sections, the motor starts and accelerates to running speed, the return to full line voltage is then effected by first opening the switches 18 and 12 and closing the switches 11 and 28 to put full voltage on the winding section 6 and then opening the switches 13 and 27 and closing the switch 18 to apply full line voltage to the winding section 7.

It should be understood that the apparatus shown in the drawing represents a system capable of effecting a wide variety of starting sequences and that this apparatus may be simplified, if desired, to suit installations in which only a few of the available starting steps are employed. Thus the switches, transformer taps and connections shown in the drawing which are not employed in any given starting sequence may be omitted without departing from the invention.

The various switches employed may be manually operated or may be automatically controlled by any suitable means. Thus speed or time responsive apparatus may be used to operate the switches in accordance with the acceleration of the motor, or when the system is applied to synchronous motors or to induction motors having wound secondaries, means responsive to electrical conditions in the secondary winding may be employed to govern the operation of the various starting switches. Frequency responsive relays of a type suitable for governing the operation of the starting switches in accordance with electrical conditions in secondary windings are shown in reissue Patent No. 17,180 and in my copending applications above referred to.

In the appended claims, the term "full voltage" is employed to designate the full line voltage which the motor windings are designed to carry when the motor is fully energized and operating at normal speeds, and the terms "reduced voltage" and "over-voltage" are respectively employed to designate voltages lower and higher than such line voltage.

My improved starting method incorporates many highly desirable features. Not only are increasing voltages applied to the motor in successive steps without undesirable line surges, but the transfer from one voltage to the other is accomplished without appreciable loss of torque. Since at least one section of the motor primary winding is energized at all times during the starting period, and since the voltage applied to the windings may be increased in relatively small steps at suitable intervals during starting, the starting torque may be increased substantially continuously and the driven apparatus started smoothly under various load conditions. Since the energy drawn from the line is distributed between two separate winding sections and the changes in voltage are effected separately by deenergizing and energizing the winding sections, the amount of current broken at any given switching device is comparatively small, and arcing at the switch contacts is effectively reduced.

I claim:

1. The method of starting an electric motor having a primary winding comprising at least two separately energizable winding sections which comprises successively supplying increasing reduced terminal voltages alternately to the winding sections and successively supplying full terminal voltage to the winding sections.

2. The method of starting an electric motor having a primary winding comprising a plurality of separately energizable winding sections which comprises supplying reduced terminal voltage to one of said winding sections, supplying a higher reduced terminal voltage to another of said winding sections, successively disconnecting the terminal voltages so supplied from each of said sections and successively supplying higher reduced terminal voltages thereto and finally successively supplying full terminal voltage to each of said sections.

3. The method of starting an electric motor having a primary winding comprising at least two separately energizable winding sections which comprises supplying reduced terminal voltage to one of said winding sections, supplying a higher terminal voltage to the other of said winding sections and supplying said higher terminal voltage to said first mentioned section while said second mentioned section is energized.

4. The method of starting an electric motor having a primary winding comprising at least two separately energizable winding sections which comprises supplying reduced terminal voltage to one of said winding sections, supplying a higher reduced terminal voltage to the other of said winding sections, supplying full terminal voltage to said first mentioned winding section and then supplying full terminal voltage to said second mentioned winding section.

5. The method of starting an electric motor having a primary winding comprising a plurality of separately energizable winding sections which comprises supplying reduced voltage to one of said winding sections, supplying full voltage to another of said winding sections, disconnecting said reduced voltage from said first mentioned section and supplying over-voltage thereto and then disconnecting said over-voltage from said first mentioned section and supplying full voltage thereto.

6. The method of starting an electric motor having a primary winding comprising two separately energizable winding sections which comprises supplying full voltage to one of said winding sections, supplying full voltage to the other of said winding sections, supplying over-voltage to said first mentioned section and finally supplying full voltage to said first mentioned section.

7. The combination of an electric motor having a primary winding comprising a plurality of separately energizable winding sections, a source of alternating current, a voltage changing device, means for connecting said device to said source, separate means for selectively supplying voltages other than full voltage from said device to the terminals of each of said winding sections, and means for selectively supplying full voltage from said source to the terminals of each of said winding sections.

8. The combination of an electric motor having a primary winding comprising two separately energizable winding sections, a source of alternating current, a voltage changing device, means for connecting said device to said source, separate means for respectively supplying increasing terminal voltages other than the source voltage to the terminals of said winding sections, and means for successively supplying full voltage from said source to the terminals of each of said winding sections.

9. The combination of an electric motor having a primary winding comprising at least two separately energizable winding sections, a source of alternating current, a transformer having a primary winding and a secondary winding provided with a plurality of voltage taps, means for connecting the primary winding of said transformer to said source, separate means for respectively connecting each of said primary winding sections to each of the voltage taps of said transformer secondary winding and separate means for respectively connecting each of said primary winding sections directly to said source.

10. The combination of an electric motor having a primary winding comprising two separately energizable winding sections, a source of alternating current, a transformer, means for connecting the primary winding of said transformer to said source, means for connecting the secondary winding of said transformer to one of said winding sections, means for connecting the other of said winding sections to said source and separate means for respectively connecting both of said winding sections to said source in parallel.

11. The combination of an electric motor having a primary winding comprising two separately energizable winding sections, a source of alternating current, a voltage reducing device, means for supplying reduced voltage from said source through said device to the terminals of one of said winding sections, means for supplying full voltage from said source to the terminals of the other of said winding sections, and separate means, operable independently of said means for supplying full voltage to said other winding section, for supplying full terminal voltage from said source to said first mentioned winding section.

12. The combination of an electric motor having a primary winding comprising a plurality of separately energizable winding sections, a source of alternating current, a device for supplying two different values of reduced voltage from said source, means for supplying one reduced voltage from said device to the terminals of one of said winding sections, means for supplying a higher reduced voltage from said device to the terminals of another of said winding sections and means for successively supplying full voltage from said source to the terminals of each of said winding sections.

13. The combination of an electric motor having a primary winding comprising two separately energizable winding sections, a source of alternating current, a transformer having a primary winding and a secondary winding provided with high and low reduced voltage taps, means for connecting the primary winding of said transformer to said source, means for connecting one of said motor primary winding sections to the low reduced voltage taps of said transformer secondary winding, means for connecting the other of said motor primary winding sections to the high reduced voltage taps of said transformer secondary winding and separate means for successively connecting each of said motor primary winding sections directly to said source.

14. The combination of an electric motor having a primary winding comprising two separately energizable winding sections, a source of alternating current, a device for supplying reduced voltage and over-voltage from said source, means for supplying reduced voltage from said device to one of said winding sections, means for connecting the other of said winding sections to said source, means for supplying over-voltage from said device to said first mentioned winding section and means for directly connecting said first mentioned winding section to said source.

In testimony whereof I affix my signature.

RUPERT NUCKOLLS EARLY.